US008399810B2

(12) United States Patent  
Ahmed

(10) Patent No.: US 8,399,810 B2
(45) Date of Patent: Mar. 19, 2013

(54) ELECTRIC PATIO BISTRO

(75) Inventor: Mallik Ahmed, Columbus, GA (US)

(73) Assignee: W. C. Bradley Co., Columbus, GA (US)

( * ) Notice: Subject to any disclaimer, the term of this patent is extended or adjusted under 35 U.S.C. 154(b) by 381 days.

(21) Appl. No.: 12/849,850

(22) Filed: Aug. 4, 2010

(65) Prior Publication Data

US 2011/0186561 A1 Aug. 4, 2011

Related U.S. Application Data

(60) Provisional application No. 61/233,031, filed on Aug. 11, 2009.

(51) Int. Cl.
H05B 1/00 (2006.01)
H05B 3/68 (2006.01)
(52) U.S. Cl. ............ 219/438; 219/386; 219/450.1
(58) Field of Classification Search ........... 219/386, 219/438, 450.1
See application file for complete search history.

(56) References Cited

U.S. PATENT DOCUMENTS

| 3,490,359 | A | | 1/1970 | Seitz |
|---|---|---|---|---|
| 3,623,422 | A | * | 11/1971 | Marshall ............ 99/400 |
| 3,805,688 | A | | 4/1974 | Gvozdjak |
| 3,946,651 | A | | 3/1976 | Garcia |
| 4,403,597 | A | | 9/1983 | Miller |
| 4,703,746 | A | | 11/1987 | Hitch |
| 4,862,795 | A | | 9/1989 | Hawkins |
| 5,197,379 | A | * | 3/1993 | Leonard, Jr. ............ 99/446 |
| 5,277,106 | A | | 1/1994 | Raymer et al. |
| 5,355,780 | A | | 10/1994 | Campbell |
| 5,355,868 | A | | 10/1994 | Haen |
| 5,467,691 | A | | 11/1995 | Koziol |
| 5,546,851 | A | * | 8/1996 | Goto ............ 99/446 |
| 5,582,094 | A | * | 12/1996 | Peterson et al. ............ 99/445 |
| 5,603,256 | A | | 2/1997 | Charlson et al. |
| 5,735,260 | A | | 4/1998 | Rimback |
| 5,911,812 | A | | 6/1999 | Stanek et al. |
| 5,974,954 | A | | 11/1999 | Rigney et al. |
| 6,104,004 | A | | 8/2000 | Ragland et al. |
| 6,114,666 | A | | 9/2000 | Best |
| 6,314,870 | B1 | | 11/2001 | Staller et al. |
| 6,520,174 | B1 | | 2/2003 | Scgliuolo |
| 7,066,169 | B2 | | 6/2006 | Feldewerth et al. |
| 7,207,326 | B2 | | 4/2007 | McKenzie et al. |
| 2002/0189604 | A1 | | 12/2002 | McKenzie |
| 2006/0003279 | A1 | | 1/2006 | Best |
| 2006/0021517 | A1 | | 2/2006 | Best |
| 2007/0125357 | A1 | | 6/2007 | Johnston |
| 2007/0295223 | A1 | * | 12/2007 | Reischmann et al. ......... 99/444 |
| 2008/0072890 | A1 | | 3/2008 | Best |
| 2008/0121117 | A1 | | 5/2008 | Best |
| 2002/0202688 | | | 8/2009 | Best |
| 2009/0308374 | A1 | | 12/2009 | Ahmed |

FOREIGN PATENT DOCUMENTS

EP 1 776 028 B1 10/2008

OTHER PUBLICATIONS

PCT/US2010/044380, "International Search Report and Written Opinion", Oct. 27, 2010.

* cited by examiner

Primary Examiner — Angel Roman
(74) Attorney, Agent, or Firm — Fellers, Snider, Blankenship, Bailey & Tippens, P.C.

(57) ABSTRACT

A grilling apparatus comprising: a base housing; a cooking grate positionable on or in an upper portion of the base housing; a radiant heat cavity within the base housing below the cooking grate; at least one electric heating element within the radiant heat cavity; and a reflective surface within the radiant heat cavity which diverges outwardly in an upward direction at an angle of from 20° to 60° from horizontal.

14 Claims, 6 Drawing Sheets

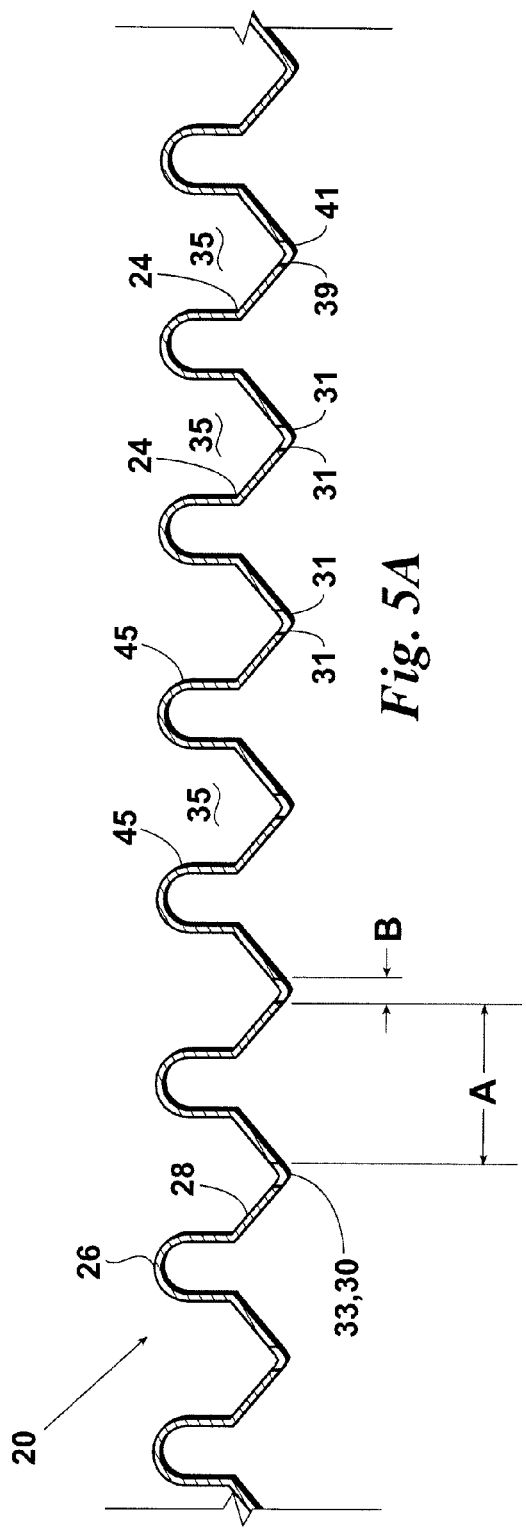
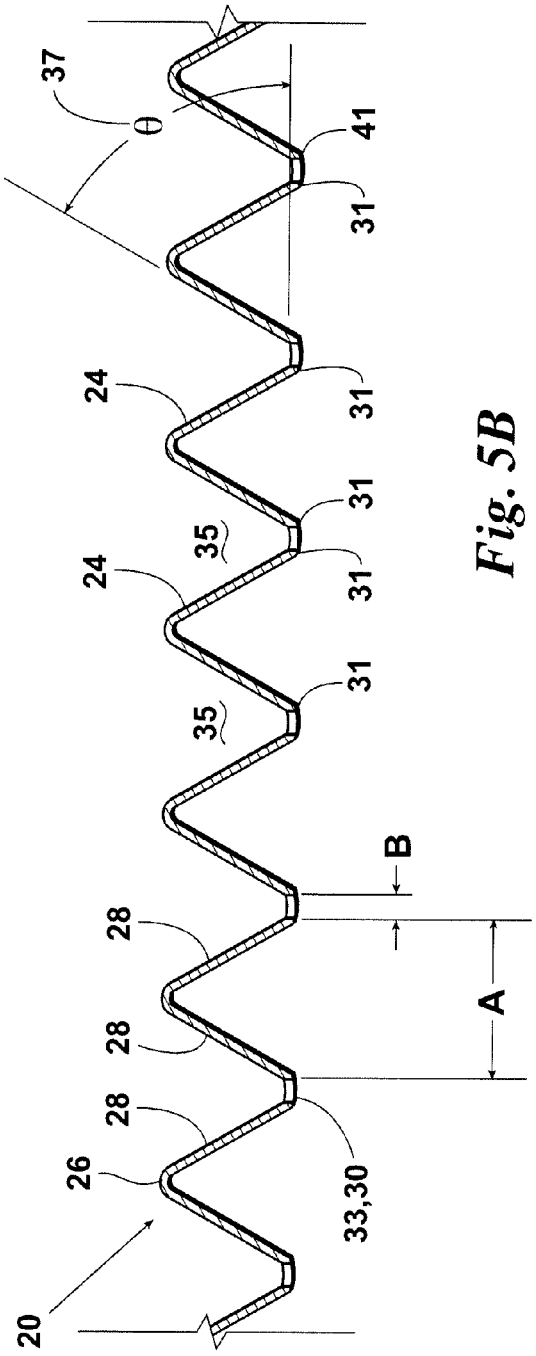

ELECTRIC PATIO BISTRO

This application claims the benefit of pending U.S. Provisional Patent Application Ser. No. 61/233,031, filed on Aug. 11, 2009, and incorporates said provisional Application Ser. No. 61/233,031 by reference into this document as if fully set out at this point.

FIELD OF THE INVENTION

The present invention relates to electric cooking grills. More particularly, but not by way of limitation, the present invention relates to an outdoor grill having a radiant cavity below a food supporting grate, wherein the grate is designed to allow heat from the radiant cavity to pass therethrough.

BACKGROUND OF THE INVENTION

For many years, since the development of outdoor grilling appliances in the nineteen forties and fifties, there has been a desire for an effective electrically powered outdoor cooking appliance. It has long been believed that such a device might be made more convenient and easier to use, e.g., without requiring special fuel like a charcoal or propane. In recent years, the growing availability of electrical energy from renewable or otherwise environmentally friendly resources has added further impetus for the use of such electrical appliances.

The current electrical outdoor grilling appliance art includes two types of products. In the first type, an electrical resistance heating element is embedded in a cooking grate. As the current heats the element, the element transfers heat by conduction to the grate, which is usually made of a conductive material such as aluminum. The grate, in turn, heats the food by conduction. Typically, slots are provided in the grate for the drainage of grease. By alternating the contact areas and the open slots, the grill can produce, under favorable circumstances, a pattern of "sear" marks, which are desirable when grilling.

In the second type of product, a radiant heating element is suspended below an open wire-type cooking grate and surrounded by some type of insulating material. Food is cooked by radiant heat through the open grate and by some conduction from the cooking grate, which is heated by a radiant element. The conductive heat from the grate can produce, under favorable circumstances, the pattern of "sear" marks desired for grilling. This type of grill is generally described in U.S. Pat. No. 6,104,004.

The first type of grill suffers from the problem that the temperature of the heated cooking surface must be held below the ignition point of grease or fire will occur at the point of cooking. However, the required low temperature will not sufficiently vaporize grease to produce smoke that normally flavors the meat when grilling. Furthermore, the required low temperature allows accumulated grease to gather on the surface of the cooking grate around the food despite the provision of grease drainage features. This accumulated grease further reduces cooking effectiveness by acting as a liquid coolant for the cooking surface.

In the second type of grill, good cooking performance can only be achieved by cooking with the lid closed as much as possible since the design and cooking performance of these grills depend on the establishment of a large radiant cavity below and above the food that is supported on the grate, as shown in U.S. Pat. No. 6,104,004. If the lid is opened, the cavity is not only split into two open halves, but most of the radiant energy generated by the heating element is lost to the atmosphere with little effective retention by the food and the open wire-type cooking grate.

Both types of grills also suffer from a lack of power density. This condition is driven by wattage limitations of standard US residential electrical systems. An absolute upper limit of 1800 watts set by a 120 volt current limited by a 15 amp circuit breaker produces a thermal energy equivalent of 6,147 BTU/hr for an entire cooking surface. In the case of a 200 square inch cooking surface, a maximum power density of 30.7 BTU/hr/in$^2$ results. This power density is very much lower than the common 100 BTU/hr/in$^2$ maximum of a conventional gas grill and is still much lower than the 60 to 80 BTU/hr/in$^2$ typical of some new gas infrared cooking systems. As a result, in less than ideal conditions, such as a cold windy day, the electrical cooking appliance may not produce adequate cooking results.

SUMMARY OF THE INVENTION

The present invention provides a novel and useful design that addresses current limitations of the art and allows cooking, often with the lid open, at usefully high temperature with "sear" marks and grilling flavor from smoke production. The inventive apparatus preferably comprises a new type of cooking grate used in conjunction with a radiant heating element and a heat retaining grill body construction.

In one aspect, there is provided an apparatus for grilling a food product. The apparatus comprises: a base housing; a cooking grate removably positionable on, or removably positionable in, an upper portion of the base housing; a radiant heat cavity within the base housing wherein the cooking grate covers at least most of an upper end of the radiant heat cavity when the cooking grate is positioned on or in the upper portion of the base housing; and at least one electric heating element positioned in the radiant heat cavity such that the electric heating element will be positioned elevationally below the cooking grate. The cooking grate preferably has openings therethrough which are open to air flow and are sized such that the total area of the openings is not more than 28% of the total horizontal area covered by the cooking grate. In addition, the radiant heat cavity preferably has an upwardly extending reflective interior surface which substantially surrounds at least a lower vertical portion of the radiant heat cavity. The upwardly extending reflective interior surface diverges outwardly in an upward direction at a divergence angle in a range of from 20° to less than 60° from horizontal.

The upwardly extending reflective interior surface of the radiant heat cavity preferably has a conical or frusto-conical shape. Also, the openings in the cooking grate are preferably slots having a width of from 2.5 mm to 5.5 mm. Alternatively, the openings can be holes (preferably of a diameter of from 2.5 mm to 5.5 mm) or a combination of two or more shapes.

In addition, the cooking grate preferably has an upper surface comprising: (a) a series of parallel elongate channels, each of the elongate channels having an elongate bottom with a left transverse side and a right transverse side; (b) an elongate right sidewall which preferably extends upwardly from the right transverse side of the elongate bottom; and (c) an elongate left side wall which preferably extends upwardly from the left transverse side of the elongate bottom. The left elongate sidewall and right elongate sidewall preferably diverge outwardly away from each other in an upward direction such that each of the right and left elongate sidewalls extends transversely from the elongate bottom at an angle of from 45° to 70° from horizontal. It is also preferred that the openings provided through the cooking grate be located in the elongate bottoms of the parallel elongate channels.

Further, it is also preferred that the cooking grate comprise a series of parallel upper elongate rib peaks between the parallel elongate channels for supporting the food product over the elongate channels. When the electrical heating element is operating at full power from a 120 volt, 1800 watt power source, the inventive apparatus will preferably operate such that at least 65% of the total heat flux at a height of 0.375 inch above the parallel upper elongate rib peaks will be infrared radiant energy. More preferably, at least 70% of the total heat flux at a height of 0.375 inch above the parallel upper elongate rib peaks will be infrared radiant energy when the electrical heating element is operating at full power.

In another aspect, the upwardly extending reflective interior surface of the inventive apparatus is preferably an interior surface of an upwardly extending interior wall which is positioned in the base housing and which diverges outwardly in the upward direction. Moreover, the apparatus preferably further comprises a reflective shield which is positioned outside of the upwardly extending interior wall and has an inner surface which faces the upwardly extending interior wall and which diverges outwardly in the upward direction such that a gap is formed between the upwardly extending interior wall and the reflective shield. By way of example, the upwardly extending interior wall will preferably be formed of porcelain-coated steel and the reflective shield will preferably be formed of aluminized steel or stainless steel.

It is also preferred that the inner surface of the reflective shield diverge outwardly in the upward direction at an angle of divergence which is substantially identical to the divergence angle of the upwardly extending reflective interior surface of the upwardly extending interior wall. Further, it is preferred that the inner surface of the reflective shield and the upwardly extending reflective interior surface of the upwardly extending interior wall each have a conical or frusto-conical shape.

In another aspect, there is provided an outdoor grill preferably comprising: (a) a housing including a base member and a lid member for resting on the base member for creating an enclosed space; (b) a cooking grate positioned within the enclosed space and supported by the base member, wherein the enclosed space includes an upper cavity defined by an inside surface of the lid member and an upper surface of the cooking grate and the enclosed space includes a lower radiant heat cavity defined by an upper surface of a first downwardly sloping reflective member (e.g., a reflective cone) and a lower surface of the grate member; (c) an electrical heating element below the cooking grate; (d) the first downwardly sloping reflective member being below the heating element, the first downwardly sloping reflective member defining a first drain orifice; (e) a second downwardly sloping reflecting member below the heating element, the second downwardly sloping reflective member defining a second drain orifice, wherein the base member also defines a base member orifice; (f) a grease collection member for catching grease migrating through the first drain orifice, the second drain orifice, and the base member orifice; and (g) a base structure including a plurality of legs in communication with the base member for supporting the base member.

Further aspects, features, and advantages of the present invention will be apparent to those of ordinary skill in the art upon examining the accompanying drawings and upon reading the following detailed description of the preferred embodiments.

BRIEF DESCRIPTION OF THE DRAWINGS

FIG. 5A shows a first alternate section of the cooking grate 20 of the outdoor grill 10 of FIG. 1;

FIG. 5B shows a second alternate section of the cooking grate 20 of the outdoor grill 10 of FIG. 1.

DETAILED DESCRIPTION OF THE PREFERRED EMBODIMENTS

Figure 1:
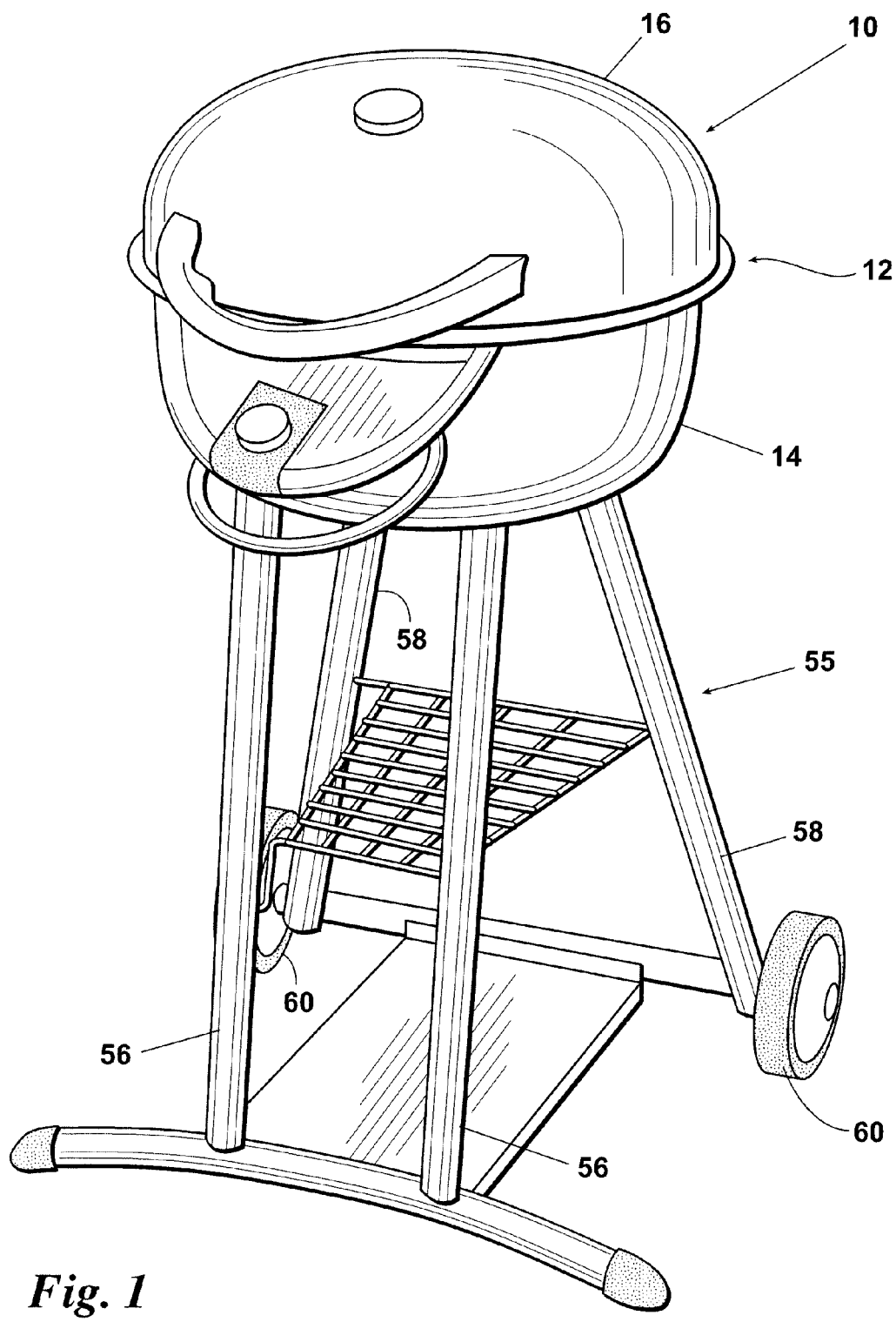
FIG. 1 is a perspective view of an outdoor grill 10 of the invention.
Figure 2:
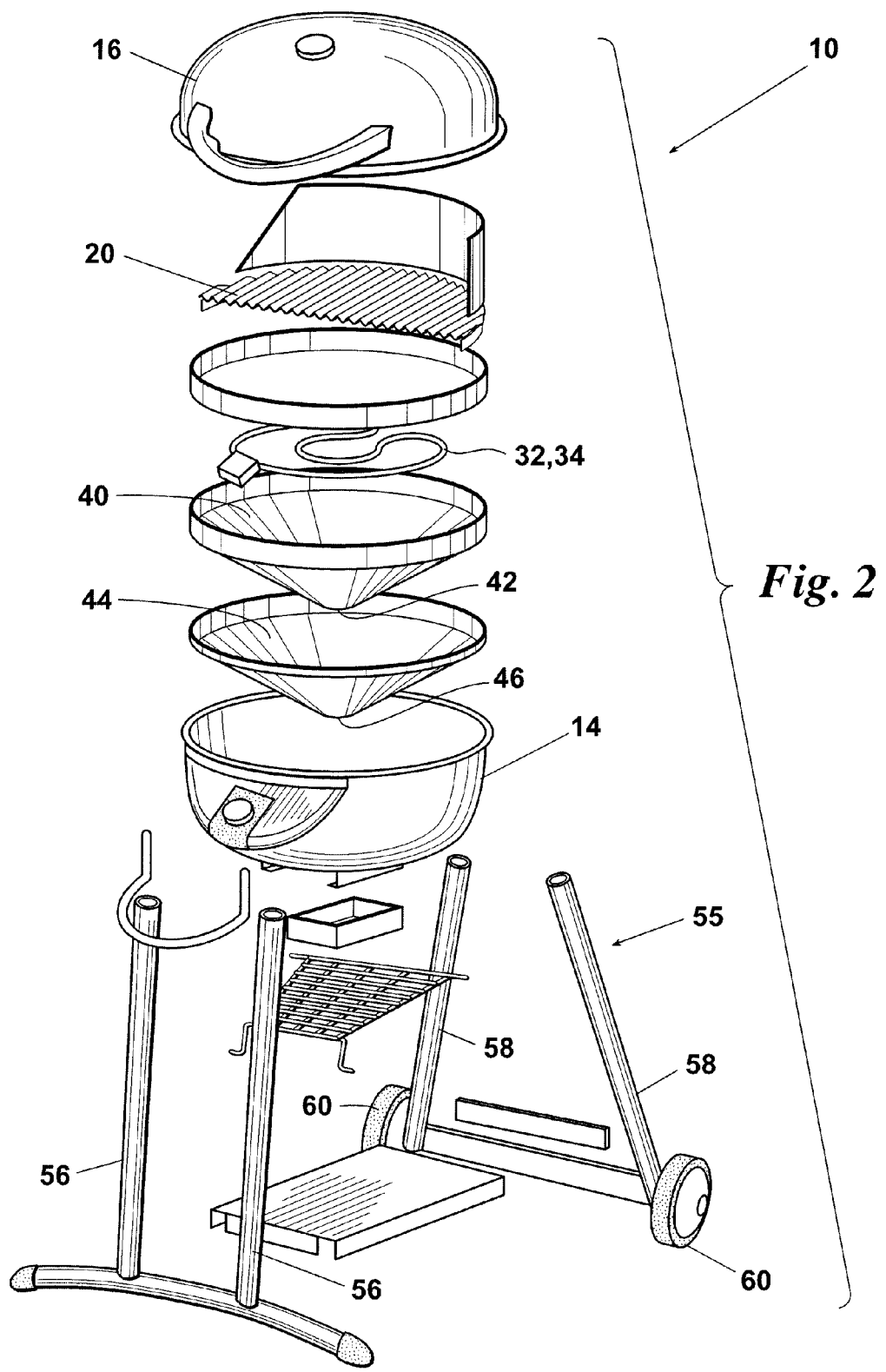
FIG. 2 is an exploded view of the outdoor grill 10 of FIG. 1.
Figure 3:
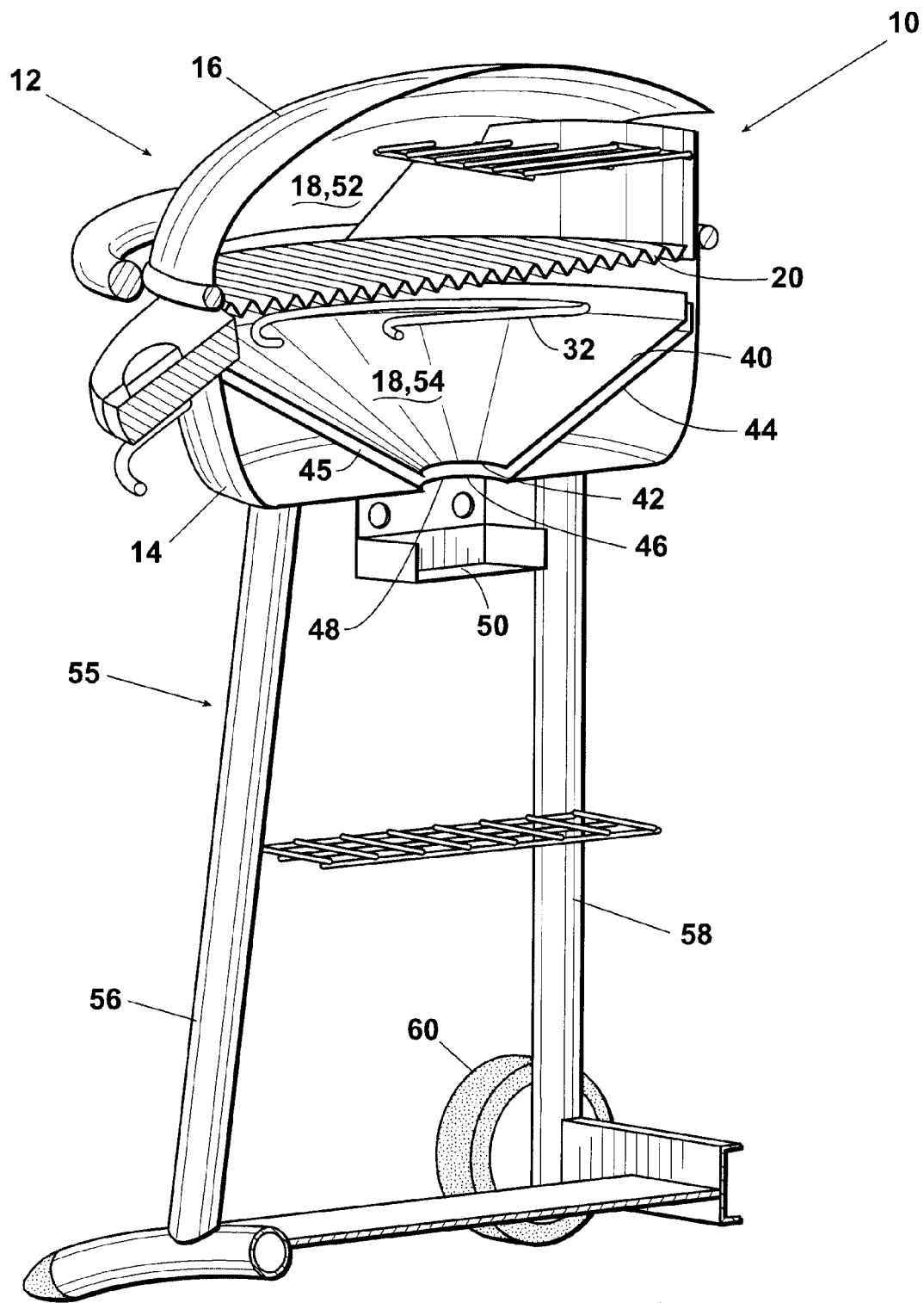
FIG. 3 is a cross sectional view of the outdoor grill 10 of FIG. 1.
Figure 4:
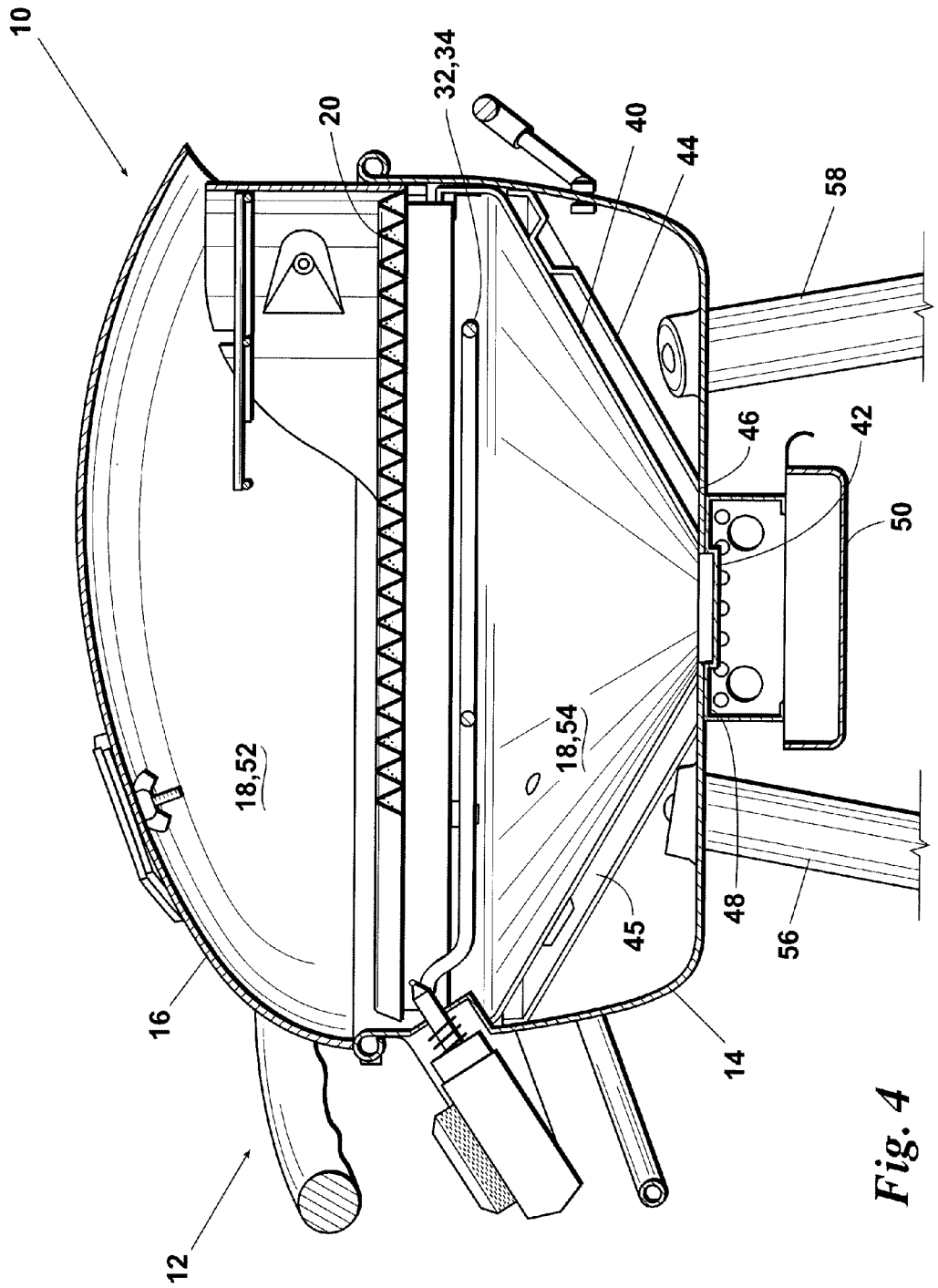
FIG. 4 is an enlarged cross sectional view of the grill body of the outdoor grill 10 of FIG. 1.

Referring now to FIGS. 1-6, shown is an outdoor grill 10. Outdoor grill 10 includes a housing 12. Housing 12 is made up of a base member (base housing) 14 and a lid member 16. Lid member 16 rests on an upper surface of base member 14 for creating enclosed space 18 (FIGS. 3 and 4).

Figure 6:
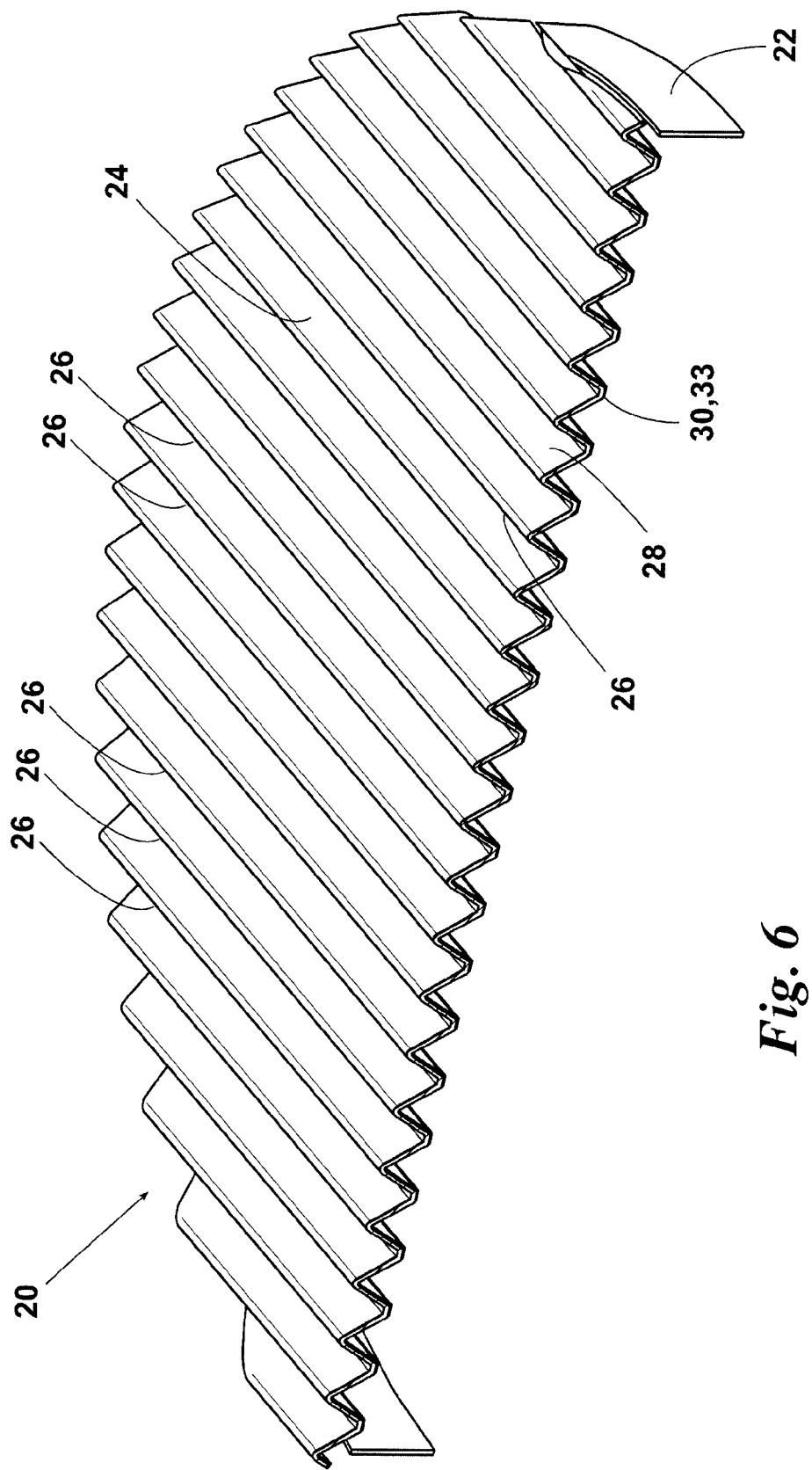
FIG. 6 is a perspective view of the cooking grate 20 of FIG. 5B.

A cooking grate 20 (FIGS. 2-6) is positioned within enclosed space 18. Cooking grate 20 is preferably supported by base member 14. As shown in FIG. 6, cooking grate 20 includes a support member 22 from which extend a plurality of parallel members 24.

Still referring to FIGS. 5-6, plates 28 on adjacent parallel members 24 are separated from one another by a distance B for forming slots 30 between each parallel member 24. The width B of the slots 30 is narrow enough to reduce the passage of flame from underneath and restrict the flow of air to reduce combustion on the plates 28, but slots 30 are wide enough to allow grease that is not fully vaporized by the plates 28 to pass below cooking grate 20 and into enclosed space 18 and then onto the reflective member 40. The lateral (transverse) width B of the slots 30 will preferably be in a range of from 2.5 mm to 5.5 mm and will more preferably be from 3 mm to 4.5 mm.

The cooking grate 20 preferably comprises of a series of inverted V-shaped (FIGS. 5B and 6) or partially V-shaped (FIG. 5A) parallel elements 24 placed so that the lower corners 31 of each inverted V section are in close proximity to the adjoining section, creating a gap 33 between each inverted V section. The top 26 of each inverted V-shaped or partially V-shaped member 24 forms a vertex peak, an inverted U peak, or other rib peak 26 that may be sharp radiused (FIGS. 5B and 6) or rounded (FIG. 5A). The parallel elongate rib peaks 26 support the food product above the elongate parallel upper grate channels 35 formed between the parallel elongate inverted V or partial V-shaped elements 24.

The ratio of the gap width B between the inverted V sections 24 and the width A of each V section will preferably range from 30% to 5%, more preferably from 28% to 15%. The purpose of the gaps 33 is to allow drainage of grease and other liquid off the cooking grate 20. The slot openings 30 of the grate 20 are preferably located in the bottoms of the grate channels 35 and are preferably the same width B as the gaps 33 as illustrated in FIGS. 5A, 5B, and 6 so that the total area of the openings 30 is preferably not more than 30%, more preferably not more than 28%, and most preferably from 15% to 28%, of the total horizontal planar area covered by the cooking grate 20 (i.e., the planar area of the cooking grate 20 as viewed from above). To provide rapid drainage off the grate surface, the angle 37 to the horizontal of the legs 28 of the inverted V or partially V-shaped elements 24 which extend upwardly from the transverse left and right sides 39, 41 of the gaps 33 will preferably be in the range of from 45° to 70°. The legs 28 also form the sidewalls of the grate channels 35.

The cooking grate 20 described can be made of a multiplicity of separate inverted V or partial V sections 24 or can be stamped out of a single or several large pieces of appropriate material with the gap 33 between inverted V sections 24 formed as a slot 30 or multiple slots 30 along the bottom vertex thus formed of the V sections 24. It will be noted that the grate geometry in section can be defined by an upper vertex 26 and the two lower edges 31 which form the inverted V-shape described here. However, as illustrated in FIG. 5A, the same effect can be attained by maintaining the relationship between these three points and having a form other than a straight line connecting the points. For example, the straight line could be broken into connected line segments. In addition, the straight line could be replaced by some arcuate segments (e.g., an inverted U-shaped upper portion 45 as seen in FIG. 5A). The essential commonality is a slot 30 with upwardly oriented walls 28 on either side forming an upper channel 35 generally centered above the slot 30. A version could be built in which the slot is not fully centered in the channel and the benefits would still accrue.

Different types of materials can be used for the parts as most expedient. The grate 20 will preferably be formed of porcelain coated steel or stainless steel. In a preferred embodiment, the slots 30 at the bottom of the channels 35 of the cooking grate 20, may be increased in dimension to some extent to promote more complete grease drainage while maintaining the flame arresting features of the grate 20.

Parallel members 24 are shown as unitary members that form various geometries, including inverted V-shaped elements on either side of slots 30 (FIGS. 5B, 6) or other shapes. Slot 30 is preferably centered between adjacent ribs 26, but may be located off-center if desired. Similar and other alternative cooking grates of this type are described in my U.S. patent application Ser. No. 12/482,654, which is incorporated herein by reference Heating element 32 is preferably located below cooking grate 20. Heating element 32 may be an electrical heating element designed to radiate heat when current is applied. Though it is not necessary, it may be desired to arrange the slots 30 on the cooking grate 20 so that an open slotted area is not immediately above the heating element 32. This will reduce any tendency of dripping fat or grease to ignite on the heating element 32. Below the heating element 32 a steeply sloped surface 40 is preferably provided that leads to an opening at the bottom of the grill body.

The electrical heating element 32 will preferably be a tubular-type electric resistive heater. As will be understood by those in the art, such tubular-type electric resistive heaters preferably comprise an inner metal resistive wire which is heated by the electric current and is mounted inside a metal tube which is filled with an electrically resistive but thermally conductive material such as, e.g., magnesium oxide. The outer metal tube, or sheath, will typically be heated to a high temperature of as much as 1,000° to 1,200° F. or more. Alternatively, the electric heating element 32 could be, for example, a high intensity infrared lamp element or a metal ribbon resistive heater.

In addition, rather than using a single electric heating element 32, two or more separate electrical elements could be used. If, for example, two elements are used such that each element heats approximately one-half of the cooking area, the two elements could be controlled separately or the elements can be operable such that any ratio of the power supply to the unit can be transmitted to the two elements so long as the total power consumed does not exceed, for example, the standard 1800 watt outlet limit in the U.S. or the standard 1500 watt outlet limit in Canada. The two elements could also be controlled to allow all of the power to be switched to one of the two elements, thereby doubling the power through that segment.

Although various types of power/cooking control systems can be used in the inventive apparatus, a bimetallic, electrical controller of the type known in the art will preferably be used in the inventive apparatus. Examples of other control systems which could be used in the inventive apparatus include, but are not limited to, electric power controllers using either voltage or duty cycle control either with or without electronic thermostatic control.

Referring now to FIGS. 2-4, a first downwardly sloping reflective member 40 is located within the base housing 14 preferably below heating element 32. Downwardly sloping reflective member 40 defines a first drain orifice 42. In one embodiment, the interior surface 40 has a round shape and is referred to as the inner reflective cone 40 having a conical or frusto-conical shape as shown. But it will be clear to those of ordinary skill in the art that other embodiments, including rectangular profiles, may produce the same effect. The sloping surface 40 is preferably placed well below the cooking grate 20 and below the heating element. The sloping surface 40 has two functions. The first function is to reflect downwardly directed radiant heat from the heating element 32 back upwards toward the cooking grate 20. The second function is to aggressively evacuate grease and fat drippings that pass through the slots 30 in the cooking grate to a grease collection point outside the grill body.

In a preferred embodiment, this element 40 is a cone made of a reflective material to improve the first function and of smooth surface to improve the second function. If used with an outer reflecting shield 44 of the type described below, the upwardly diverging reflective member 40 will preferably be formed of porcelain coated steel which is relatively easy to clean. However, if used alone without a reflecting shield 44, the reflective member 40 will preferably be formed of stainless steel which will provide high reflectivity on the inner reflective side but low emissivity and therefore less heat loss from its outer side.

The angle of the cone 40 is significant. If the angle is too shallow, e.g., less than 20° to the horizontal, then grease drainage will not be satisfactory. If the angle is too steep, e.g., 60° to horizontal or more, then the surface 40 will not reflect enough heat back toward the cooking grate 20. The design as shown preferably has an angle of 30° to the horizontal. As mentioned, a second downwardly sloping reflective member (shield) 44 may be provided below and adjacent the first downwardly sloping reflective member 40. The second downwardly sloping reflective member 44 defines a second drain orifice 46. Base member 14 additionally defines a base member orifice 48.

The second downwardly sloping (upwardly diverging) member 44 further improves the efficiency and performance of the appliance by minimizing heat loss of the grill body. The second member 44 provides an additional surface, such as an outer cone, placed outside of, and preferably at substantially the same angle as, the sloped surface 40 below the heating element. The outer cone 44 helps in two ways: 1) to create a stagnant air insulation gap 45 extending upwardly between reflective elements 40 and 44 to reduce convective heat loss; and 2) to act as a second radiation heat shield to reduce radiation heat loss. Therefore, it is preferably made of a reflective material such as, e.g., aluminized steel or stainless steel. Both the steeply sloping surface 40 and any additional heat shield 44 are inside the grill body (i.e., inside the base housing 14).

Still referring to FIGS. 2-4, a grease collection member 50 is provided for catching grease that drips off cooking grate 20 and migrates through first drain orifice 42, second drain orifice 46, and base member orifice 48.

Enclosed space 18 is made up of an upper cavity 52 (FIGS. 3 and 4), which is defined by an inside surface of lid member 16 and an upper surface of cooking grate 20. The lid can be insulated for further efficiency. Enclosed space 18 additionally includes a lower radiant heat cavity 54 (FIGS. 3 and 4), which is defined by the upper (interior) surface of first downwardly sloping reflective member 40 and a lower surface of cooking grate 20.

Outdoor grill 10 additionally preferably includes a base structure 55. Base structure 55 provides support for outdoor grill 10 and preferably includes a pair of front legs 56 and a pair of rear legs 58 and may or may not include wheels 60.

Since the area of the openings 30 through the cooking grate 20 preferably totals only from 5% to 30%, more preferably only from about 15% to about 28%, of the horizontal planar area of the grate, the grate 20 intercepts from about 70% to 95%, more preferably from about 72% to about 85% of the radiant heat which is produced by the electric element 32 or reflected within the radiant heat cavity. This intercepted radiant heat in turn heats the cooking grate 20 and cooks the food by a combination of conduction where the food product contacts the grate 20 and by infrared radiation from the upper inclined surfaces 28 of the grate 20. When the electric heating element 32 is operated at full power from a 120 volt, 1800 watt power source, at least 65% of the heat flux at a height of 0.375 inch above the upper rib peaks 26 of the grate 20 will preferably be infrared radiant energy. More preferably, when the electric heating element 32 is operated at full power from a 120 volt, 1800 watt power source, at least 70% of the total heat flux at a height of 0.375 inch above the grate rib peaks 26 will be infrared radiant energy.

The invention provides several advantages over the current art. The light weight, radiantly heated grate 20 provides distinct sear marks from the peaks of the grate. The slots 30 in the valleys 35 of the grate 20 allow rapid grease evacuation away from the cooking food. The small net open area of the grate 20, defined by the ratio of the gap B to the width A of the inverted V or partial V sections 24, results in the majority of the radiant heat developed by the heating element 32 being trapped in a radiant heat cavity 54 below the grate and within a space defined by the steeply sloped surface 40 below the radiant element. Therefore, it is possible to often cook with the lid open since, rather than a large radiant cavity that comprises the volumes above and below the cooking grate as taught in the prior art, the grill 10 of the invention has one smaller cavity 54 comprising the volume defined by the grate 20 and the steeply sloping surface 40 below the grate 20, which remains the same whether the lid 16 is open or closed.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. An apparatus for grilling a food product comprising:
    a base housing;
    a cooking grate removably positionable on, or removably positionable in, an upper portion of said base housing wherein said cooking grate has openings therethrough which are open to air flow and said openings are sized such that a total area of said openings is not more than 28% of a total horizontal planar area covered by said cooking grate;
    a radiant heat cavity within said base housing wherein said cooking grate covers at least most of an upper end of said radiant heat cavity when said cooking grate is positioned on or in said upper portion of said base housing; and
    at least one electric heating element positioned in said radiant heat cavity such that said electric heating element will be located elevationally below said cooking grate,
    said radiant heat cavity having an upwardly extending reflective interior surface which substantially surrounds at least a lower upwardly extending portion of said radiant heat cavity, wherein said upwardly extending reflective interior surface diverges outwardly in an upward direction at a divergence angle in a range of from 20° to less than 60° from horizontal which is effective for reflecting heat toward said cooking grate and for drainage; and
    said upwardly extending reflective interior surface has a conical or frusto-conical shape.

2. The apparatus of claim 1 wherein said openings in said cooking grate are slots having a width of from 2.5 mm to 5.5 mm.

3. The apparatus of claim 1 wherein said openings in said cooking grate are holes having a diameter of from 2.5 mm to 5.5 mm.

4. The apparatus of claim 1 wherein an upper surface of said cooking grate comprises:
    a series of parallel elongate channels, each of said elongate channels having an elongate bottom with a left transverse side and a right transverse side,
    each of said parallel elongate channels having an elongate right side wall extending upwardly from said right transverse side of said elongate bottom, and
    each of said parallel elongate channels having an elongate left side wall extending upwardly from said left transverse side of said elongate bottom,
    wherein said left elongate side wall and said right elongate side wall diverge outwardly away from each other in an upward direction such that each of said right and said left elongate side walls extends transversely from said elongate bottom at an angle of from 45° to 70° from horizontal.

5. The apparatus of claim 4 wherein said openings of said cooking grate are located in said elongate bottoms of said parallel elongate channels.

6. An apparatus for grilling a food product comprising:
    a base housing;
    a cooking grate removably positionable on, or removably positionable in, an upper portion of said base housing wherein said cooking grate has openings therethrough which are open to air flow and said openings are sized such that a total area of said openings is not more than 28% of a total horizontal planar area covered by said cooking grate;
    a radiant heat cavity within said base housing wherein said cooking grate covers at least most of an upper end of said radiant heat cavity when said cooking grate is positioned on or in said upper portion of said base housing; and
    at least one electric heating element positioned in said radiant heat cavity such that said electric heating element will be located elevationally below said cooking grate,
    said radiant heat cavity having an upwardly extending reflective interior surface which substantially surrounds at least a lower upwardly extending portion of said radiant heat cavity, wherein said upwardly extending reflective interior surface diverges outwardly in an upward direction at a divergence angle in a range of from 20° to less than 60° from horizontal, said cooking grate comprises a series of parallel upper elongate rib peaks for supporting said food product and when said electrical heating element is operated at full power from a 120 volt, 1800 watt power source, at least 65% of a total heat flux at a height of 0.375 inch above said parallel upper elongate rib peaks will be infrared radiant energy.

7. The apparatus of claim 6 wherein when said electrical heating element is operated at full power from a 120 volt, 1800 watt power source, at least 70% of said total heat flux at a height of 0.375 inch above said parallel upper elongate rib peaks will be infrared radiant energy.

8. An apparatus for grilling a food product comprising:
a base housing;
a cooking grate removably positionable on, or removably positionable in, an upper portion of said base housing wherein said cooking grate has openings therethrough which are open to air flow and said openings are sized such that a total area of said openings is not more than 28% of a total horizontal planar area covered by said cooking grate;
a radiant heat cavity within said base housing wherein said cooking grate covers at least most of an upper end of said radiant heat cavity when said cooking grate is positioned on or in said upper portion of said base housing; and
at least one electric heating element positioned in said radiant heat cavity such that said electric heating element will be located elevationally below said cooking grate,
said radiant heat cavity having an upwardly extending reflective interior surface which substantially surrounds at least a lower upwardly extending portion of said radiant heat cavity, wherein said upwardly extending reflective interior surface diverges outwardly in an upward direction at a divergence angle in a range of from 20° to less than 60° from horizontal,
said upwardly extending reflective interior surface is an interior surface of an upwardly extending interior wall positioned in said base housing which diverges outwardly in said upward direction and
said apparatus further comprises a reflective shield which is positioned outside of said upwardly extending interior wall and has an inner surface which faces said upwardly extending interior wall and which diverges outwardly in said upward direction such that a gap is formed between said interior wall and said reflective shield.

9. The apparatus of claim 8 wherein:
said upwardly extending interior wall is formed of porcelain coated steel and
said reflective shield is formed of aluminized steel or stainless steel.

10. The apparatus of claim 8 wherein said inner surface of said reflective shield diverges outwardly in said upward direction at an angle of divergence which is substantially identical to said divergence angle of said upwardly extending reflective interior surface of said upwardly extending interior wall.

11. The apparatus of claim 10 wherein said inner surface of said reflective shield and said upwardly extending reflective interior surface of said upwardly extending interior wall each have a conical or frusto-conical shape.

12. The apparatus of claim 1 wherein said divergence angle is about 30° from horizontal.

13. An outdoor grill comprising:
a housing including base member and a lid member for resting on said base member for creating an enclosed space;
a cooking grate positioned within said enclosed space and supported by said base member;
wherein said enclosed space includes an upper cavity defined by an inside surface of said lid member and an upper surface of said cooking grate and said enclosed space includes a lower radiant heat cavity defined by an upper surface of a first downwardly sloping inner reflective member and a lower surface of said cooking grate;
an electrical heating element below said cooking grate;
said first downwardly sloping reflective member being below said heating element, said first downwardly sloping reflective member defining a first drain orifice;
a second downwardly sloping reflective member below said heating element and outside of said first downwardly sloping reflective member, said second downwardly sloping reflective member defining a second drain orifice;
wherein said base member defines a base member orifice;
a grease collection member for catching grease migrating through said first drain orifice, said second drain orifice and said base member orifice; and
a base structure including a plurality of legs in communication with said base member for supporting said base member.

14. An apparatus for grilling a food product comprising:
a base housing;
a cooking grate removably positionable on, or removably positionable in, an upper portion of said base housing wherein said cooking grate has openings therethrough which are open to air flow and said openings are sized such that a total area of said openings is not more than 28% of a total horizontal planar area covered by said cooking grate;
a radiant heat cavity within said base housing wherein said cooking grate covers at least most of an upper end of said radiant heat cavity when said cooking grate is positioned on or in said upper portion of said base housing; and
at least one electric heating element positioned in said radiant heat cavity such that said electric heating element will be located elevationally below said cooking grate,
said radiant heat cavity having an upwardly extending reflective interior surface which substantially surrounds at least a lower upwardly extending portion of said radiant heat cavity, wherein said upwardly extending reflective interior surface diverges outwardly in an upward direction at a divergence angle in a range of from 20° to less than 60° from horizontal,
wherein an upper surface of said cooking grate comprises:
a series of parallel elongate channels, each of said elongate channels having an elongate bottom with a left transverse side and a right transverse side,
each of said parallel elongate channels having an elongate right side wall extending upwardly from said right transverse side of said elongate bottom, and
each of said parallel elongate channels having an elongate left side wall extending upwardly from said left transverse side of said elongate bottom,
wherein said left elongate side wall and said right elongate side wall diverge outwardly away from each other in an upward direction such that each of said right and said left elongate side walls extends transversely from said elongate bottom at an angle of from 45° to 70° from horizontal, said openings of said cooking grate are located in said elongate bottoms of said parallel elongate channels, said cooking grate comprises a series of parallel upper elongate rib peaks between said parallel elongate channels for supporting said food product over said parallel elongate channels, and when said electrical heating element is operated at full power from a 120 volt, 1800 watt power source, at least 65% of a total heat flux at a height of 0.375 inch above said parallel upper elongate rib peaks will be infrared radiant energy.

* * * * *